(12) United States Patent
Golovashchenko et al.

(10) Patent No.: US 8,966,950 B2
(45) Date of Patent: Mar. 3, 2015

(54) METHOD OF FORMING AN INTEGRAL GRID REINFORCEMENT IN A PART USING AN ELECTRO-HYDRAULIC FORMING PROCESS

(71) Applicant: Ford Global Technologies, LLC, Dearborn, MI (US)

(72) Inventors: Sergey Fedorovich Golovashchenko, Beverly Hills, MI (US); John Joseph Francis Bonnen, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/943,888

(22) Filed: Jul. 17, 2013

(65) Prior Publication Data

US 2015/0024229 A1    Jan. 22, 2015

(51) Int. Cl.
| | |
|---|---|
| *B21D 26/12* | (2006.01) |
| *B21D 26/02* | (2011.01) |
| *B23H 7/06* | (2006.01) |
| *B23H 7/26* | (2006.01) |

(52) U.S. Cl.
CPC .................. *B23H 7/06* (2013.01); *B23H 7/265* (2013.01); *Y10S 72/707* (2013.01)
USPC .................. 72/60; 72/56; 72/370.22; 72/707; 29/421.1; 29/421.2

(58) Field of Classification Search
USPC .......... 72/54, 56, 57, 59, 60, 63, 370.22, 707; 29/421.1, 421.2
See application file for complete search history.

(56) References Cited

U.S. PATENT DOCUMENTS

| | | | | |
|---|---|---|---|---|
| 3,343,397 | A * | 9/1967 | Fournier et al. | 72/379.6 |
| 3,358,487 | A * | 12/1967 | Brejcha et al. | 72/56 |
| 7,827,838 | B2 * | 11/2010 | Golovashchenko | 72/56 |
| 8,534,106 | B2 * | 9/2013 | Golovashchenko | 72/57 |
| 8,844,331 | B2 * | 9/2014 | Golovashchenko | 72/60 |

OTHER PUBLICATIONS

Shawn Morgans—Presentation at 2011 Great Designs in Steel Seminar, Livonia, MI. http://www.autosteel.org/~/media/Files/Autosteel/Great%20Designs%20in%20Steel/GDIS%202011/04%20-%20Shawn%20Morgans%20-%20AHSS%202011%20Ford%20Explorer.pdf, pp. 1-38.

Shawn Morgans—Presentation at 2012 Great Designs in Steel Seminar, Livonia, MI. http://www.autosteel.org/~/media/Files/Autosteel/Great%20Designs%20in%20Steel/GDIS%202012/Advanced%20High-Strength%20Steel%20Technologies%20in%20the%202013%20Ford%20Fusion.pdf, pp. 1-40.

* cited by examiner

*Primary Examiner* — David B Jones
(74) *Attorney, Agent, or Firm* — Damian Porcari; Brooks Kushman P.C.

(57) ABSTRACT

A method of reinforcing a part formed from a sheet metal panel that has a predetermined area that requires reinforcement by forming a grid pattern of V-shaped channels in the predetermined area. The grid pattern may be formed by wire electrodes in an electro-hydraulic forming tool having a one-sided die. Alternatively, the grid pattern may be formed by a plurality of electrodes that are arranged in an array that is aligned in at least two directions on the opposite side of the part from the one-sided die.

7 Claims, 4 Drawing Sheets

METHOD OF FORMING AN INTEGRAL GRID REINFORCEMENT IN A PART USING AN ELECTRO-HYDRAULIC FORMING PROCESS

STATEMENT REGARDING FEDERALLY SPONSORED RESEARCH OR DEVELOPMENT

The invention was made with Government support under Contract No. DE-FG36-08G018128. The Government has certain rights to the invention.

TECHNICAL FIELD

This disclosure relates to a method of manufacturing an integral reinforcement for a part, such as a structural component of a vehicle, and to the integral reinforcement grid made according to the method.

BACKGROUND

Sheet metal stamping and spot welding are the traditional technologies used to form interior and exterior panels for vehicles and other durable goods. Sheet metal stamping processes for making automotive panels include blanking, drawing, trimming and flanging. In addition to this traditional sequence of stamping operations, a restrike operation or secondary trimming operation may be involved. This method of manufacturing was employed to make parts from mild steel for decades.

New fuel economy standards require car designers to use lighter and stronger materials such as Advanced High Strength Steels ("AHSS")/Ultra High Strength Steels ("UHSS") and Aluminum alloys. AHSS/UHSS save weight by reducing the material thickness that is compensated for by the increased strength of the replacement materials. However, design and gauge selection of many interior panels and structural parts are driven by bending and torsion stiffness.

Simple replacement of mild steels with thinner higher strength steels degrades the elastic bending and torsion performance characteristics of parts made by the higher strength materials. These performance characteristics of high strength materials are the major roadblocks that limit implementation of AHSS and UHSS in the automotive industry. Insufficient bending stiffness of stamped panels made of AHSS and UHSS steels also works against broad adoption of these materials in other durable goods.

One proposed solution that is currently being implemented is patching portions of the parts with over laid patches in local areas where the stamped blank has insufficient stiffness. For example, a hot stamped patch of Boron steel may be applied to a portion of a B-pillar reinforcement. In another example, a patch of high strength material may be bonded by polyurethane to a portion of a roof panel for reinforcing the roof. Providing a patch of the high strength materials adds weight to the vehicle and reduces the advantages offered by the adoption of high strength materials.

The problem of insufficient stiffness of stamped panels that have a design driven by elastic bending requirements and torsional stiffness is addressed by this disclosure. The lack of elastic stiffness results in the use of blanks that have an increased gauge that is counterproductive to weight savings.

The above problems and other problems are addressed by this disclosure as summarized below.

SUMMARY

According to one aspect of this disclosure, reinforcing sharp V-shaped ribs are integrally formed on stamped panels by adding an additional manufacturing operation of electro-hydraulic forming ribs or a grid on parts made of AHSS/UHSS.

The reinforcement is formed as narrow sharp channels in localized areas. The panel is first formed to the desired major curvature and then is subjected to an advanced forming process, such as electro-hydraulic forming ("EHF"), that increases the amount of strain that can be applied to the part without fracturing.

According to one aspect of this disclosure as it relates to a method of reinforcing a part, the method comprises forming a metal panel into a three dimensional shape that includes a predetermined area requiring reinforcement, and forming a grid pattern including a plurality of grooves in the area requiring reinforcement.

According to other aspects of the method, the step of forming a grid pattern may further comprise electro-hydraulically forming the grid pattern against a one-sided die by discharging at least one electrode in a fluid, wherein the fluid is contained in a vessel contacts the area requiring reinforcement. Alternatively, an electro-magnetic forming tool may be used to form the V-shaped grooves instead of electro-hydraulic forming the grooves. The step of forming a grid pattern may further comprise forming a grid of V-shaped cross-section grooves that includes a first set of parallel grooves extending in a first direction and a second set of parallel grooves that extend in a second direction, and wherein the first and second sets of grooves intersect at a predetermined angle. The predetermined angle may be approximately a right angle.

According to another aspect of this disclosure, the step of forming the grid pattern may further comprise placing the predetermined area between an electro-hydraulic chamber and a one-sided die. The electro-hydraulic chamber includes a first plurality of wire electrodes that extend in a first direction. A stored electrical charge is discharged through the wires to form a first set of the plurality of grooves into a sharp V-shaped cross-section. The predetermined area may then be placed between the electro-hydraulic chamber and the one-sided die. A second plurality of wire electrodes that extend across the electro-hydraulic chamber in a second direction that is different than the first direction. A stored electrical charge is discharged through the wires to form a second set of the plurality of grooves into a sharp V-shaped cross-section with the first and second sets of grooves intersecting at a predetermined angle.

According to an alternative embodiment of this disclosure, the step of forming the grid pattern may further comprise placing the predetermined area of the panel over an array of electrodes that are aligned in a first direction and that are aligned in a second direction, wherein the first direction and the second directions intersect. The plurality of electrodes are discharged to form a first plurality of channels in the first direction and a second plurality of channels that extend in a second direction.

The electrodes are connected to a source of stored electrical power having a first polarity, and the panel is connected to the source of stored electrical power having a second polarity that is opposite the first polarity.

According to another aspect of this disclosure, a part is disclosed that comprises a metal panel that is formed into an intermediate part shape that includes a predetermined area requiring reinforcement. A plurality of intersecting V-shaped channels are formed in the metal panel at the area requiring reinforcement. A first set of the V-shaped channels are disposed to resist deformation in a first direction and a second set of V-shaped channels are disposed to resist deformation in a second direction, wherein the first and second directions are different.

According to other aspects of this disclosure as it relates to the part, the V-shaped channels may terminate in a protruding portion that is a sharp edge. The V-shaped channels may form a grid pattern that reinforces a predetermined area of the part in at least two different directions. The grid pattern may be an array of channels that intersect at right angles. Alternatively, the grid pattern may be an array of parallel channels that intersect at acute and oblique angles. The first set of V-shaped channels may be parallel to each other, and the second set of V-shaped channels may be parallel to each other. The channels may also be oriented in a non-parallel orientation that is aligned to counter a bending moment in the part.

According to other aspects of this disclosure as it relates to a system for reinforcing a part formed from a metal panel, the system may include a first forming tool that forms the metal panel into an intermediate three dimensional part shape that includes a predetermined area that requires added strength. A second forming tool forms a plurality of channels into the predetermined area in a grid pattern after the first forming tool forms the part shape that reinforces the predetermined area in at least two directions.

According to other aspects of the system, the second forming tool may be an electro-hydraulic forming tool that has a one-sided die. The electro-hydraulic forming tool may include a first plurality of wire electrodes that are parallel to each other and extend in a first direction and a second plurality of wire electrodes that are parallel to each other and extend in a second direction. Alternatively, the electro-hydraulic forming tool may include a plurality of electrodes that are aligned in a first direction and a plurality of electrodes that are aligned in a second direction. The first direction and the second directions intersect. The electrodes are discharged to form a first plurality of channels that extend in the first direction and a second plurality of channels that extend in the second direction.

The above aspects and other aspects of this disclosure will be explained in greater detail below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
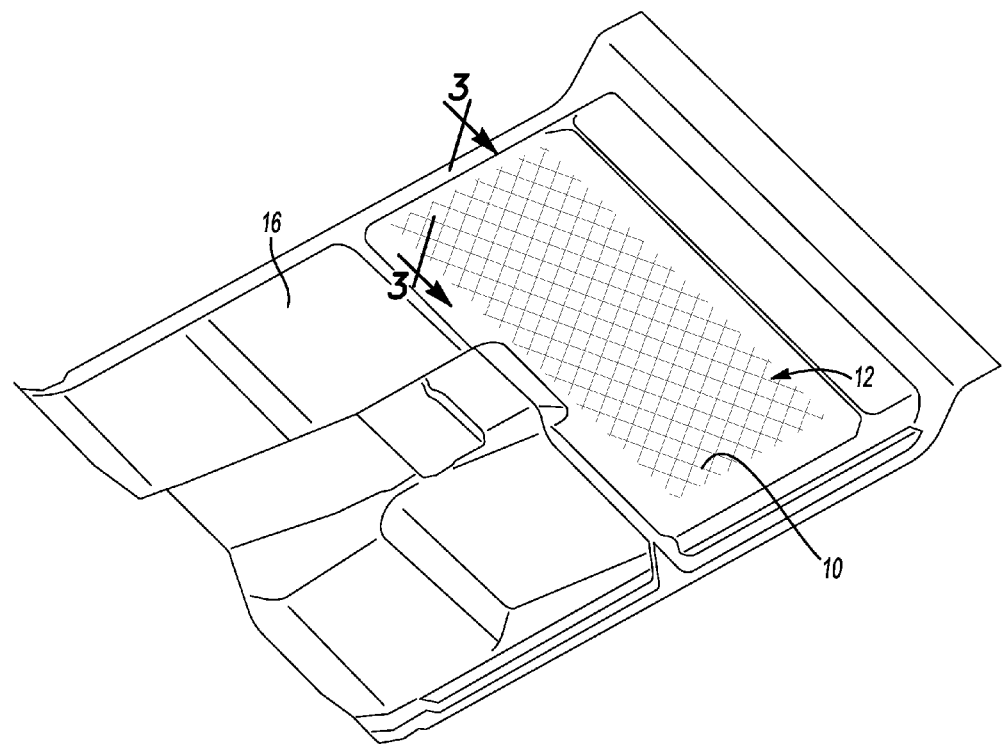
FIG. 1 is a perspective view of a compartment pan, or floor pan, of a vehicle that includes a predetermined area that is integrally reinforced with a grid pattern of sharp edged ribs.

A grid pattern of intersecting grooves 10 is illustrated that is formed on a selected portion 12 of a floor pan 16 for a vehicle (as shown in FIG. 1).

Figure 2:
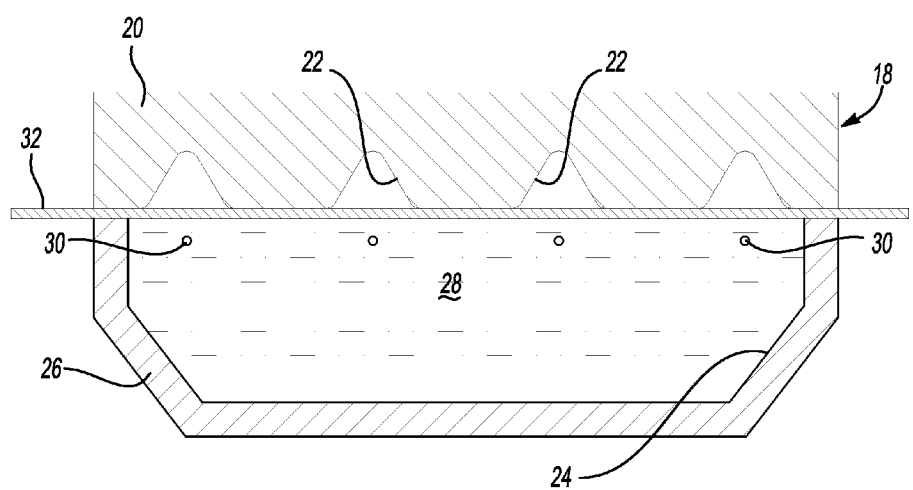
FIG. 2 is a diagrammatic cross-sectional view showing an electro-hydraulic forming chamber that may be used to form the integral reinforcement grid in a part such as the compartment pan shown in FIG. 1 or other parts that require reinforcement.

Referring to FIG. 2, an electro-hydraulic forming tool 18 is illustrated that includes a one-sided die 20. The one-sided die 20 includes a plurality of V-shaped grooves 22 that are parallel and extend in one direction across all or part of the one-sided die 20. A fluid chamber 24 is defined by a lower tool 26. The fluid chamber 24 contains a fluid 28, such as water or an aqueous solution including a rust inhibitor. As shown, four wires 30 extend across the chamber 24 and are aligned with the grooves 22 formed in the upper die 20 on the opposite side of a blank 32, or work piece.

In operation, the cavity 24 and the lower tool 26 is filled with a fluid 28. The electrode wires 30 are assembled to the lower tool 26 to extend across the cavity 24. The electrode wires 30 are connected to a source of stored energy, such as a bank of capacitors (not shown) that provide a pulse of current that is discharged through the electrode wires 30 to create a shockwave below the blank 32. The shockwave is transmitted through the fluid and causes the work piece 32 to conform to the grooves 22 in the upper die 20.

Figure 3:
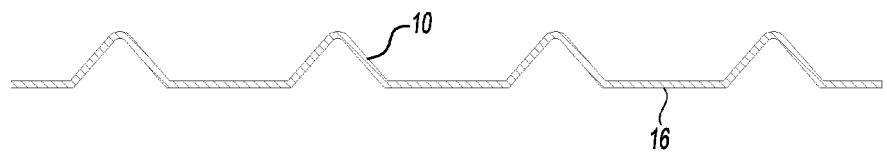
FIG. 3 is a cross-sectional view taken along the line 3-3 in FIG. 1 through a portion of a panel having an integral reinforcement grid.

Referring to FIG. 3 a cross-section of the ribs in the floor pan 16 are shown. The ribs are V-shaped and are formed with a relatively sharp distal edge that has a slightly arcuate shape due to the limits of forming the metal part in a die. The interior radius of the rib is less than 0.5 t, wherein "t" is the thickness of the metal.

Figure 4:
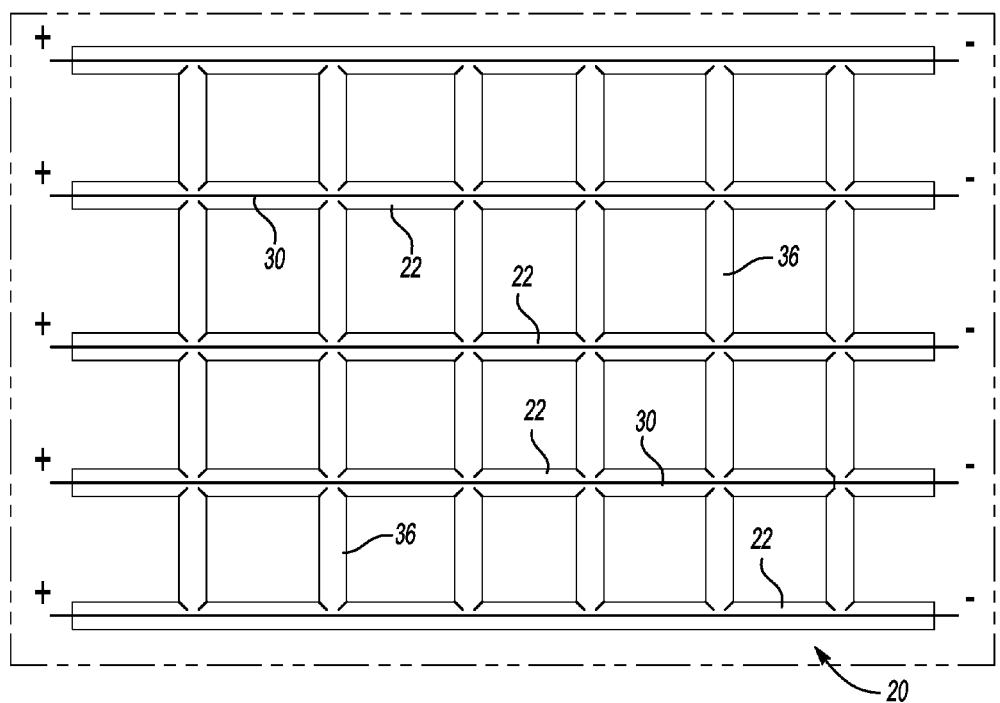
FIG. 4 is a diagrammatic view of an electrode wire electro-hydraulic forming tool that is shown ready to form the ribs of the integral reinforcement grid that extend in one direction.

Referring to FIG. 4, five wires are shown in a bottom plan view extending across the fluid chamber 24. The grooves 22 are illustrated to be in the background of the wires 30. It can be seen that the wires 30 are substantially centered relative to the grooves 22. The wires 30 are on the lower side of the work piece 32. The grooves 22 and the upper die 20 are shown to be aligned with the wires 30. A second set of grooves 36 extend perpendicular to the grooves 22. No wires are shown to be aligned with the grooves 36 because the groove pattern is formed by a first step of firing the wires that are opposite the grooves 22. After the first step is completed, wires (not shown) are installed to extend perpendicularly relative to the wires 30 and in alignment with the grooves 36.

Figure 5:
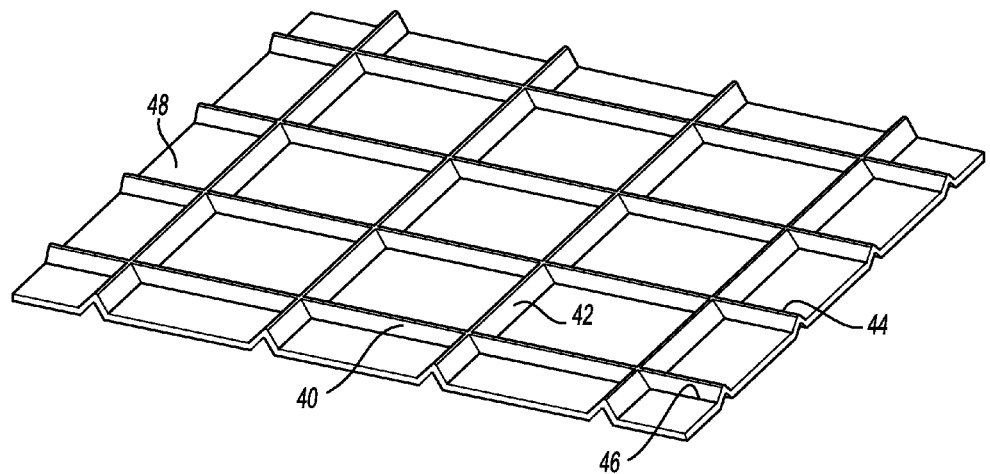
FIG. 5 is a perspective view of a panel including the integrally formed grid of reinforcement ribs.

Referring to FIG. 5, a section of the grid pattern reinforcement is shown to include a first set of V-channels 40 that are perpendicular to channels 42. The channels 40, 42 terminate in a sharp apex 44. The apex 44 preferably has an interior radius of less than 0.5 t, wherein "t" is the thickness of the metal. A sharp edged channel provides a superior reinforcement to a channel having a rounded edge. The base edges 46 of the channels 40 and 42 form a sharp edge with the body 48 of the panel.

Figure 6:
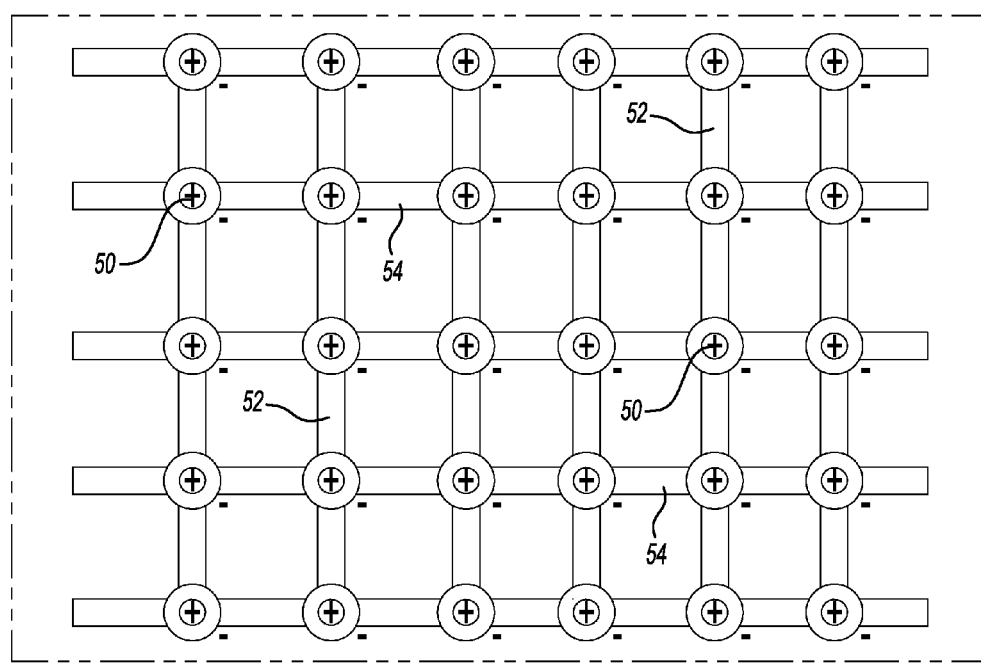
FIG. 6 is a diagrammatic view of an electro-hydraulic forming tool that includes electrodes disposed at the intersection of the ribs forming grid of integral reinforcement ribs.

Referring to FIG. 6, an alternative embodiment of an electro-hydraulic forming tool is shown in which thirty electrodes 50 are shown that are provided on the lower side of the panel 32. The electrodes 50 are immersed in the fluid 28. The electrodes 50 are aligned with the intersections of a plurality of grooves 52 extending vertically in the one sided die 20, as shown in FIG. 6, and grooves 54 that extend horizontally in the one sided die 20, as shown in FIG. 6. It should be understood that the terms "vertically" and "horizontally" as used with reference to FIG. 6 refer to the direction that they extend on that page and to not limit the orientation of the grooves 52 and 54 in the die or the orientation of the V-shaped channels 40 and 42 that are formed in the panel.

In operation, the panel is placed on the lower tool that is provided with the plurality of electrodes 50. The electrodes 50 are submerged in the fluid 28 on the opposite side of the panel 32 from the grooves 52 and 54 in the one sided die 20. The electrodes 50 are connected to a source of stored electrical current, such as a bank of capacitors. The electrodes 50 are discharged below the surface of the liquid 28 to create a shockwave that flows through the fluid 28 and forms the panel 32 into the grooves 52 and 54 of the one-sided die 20.

Figure 7:
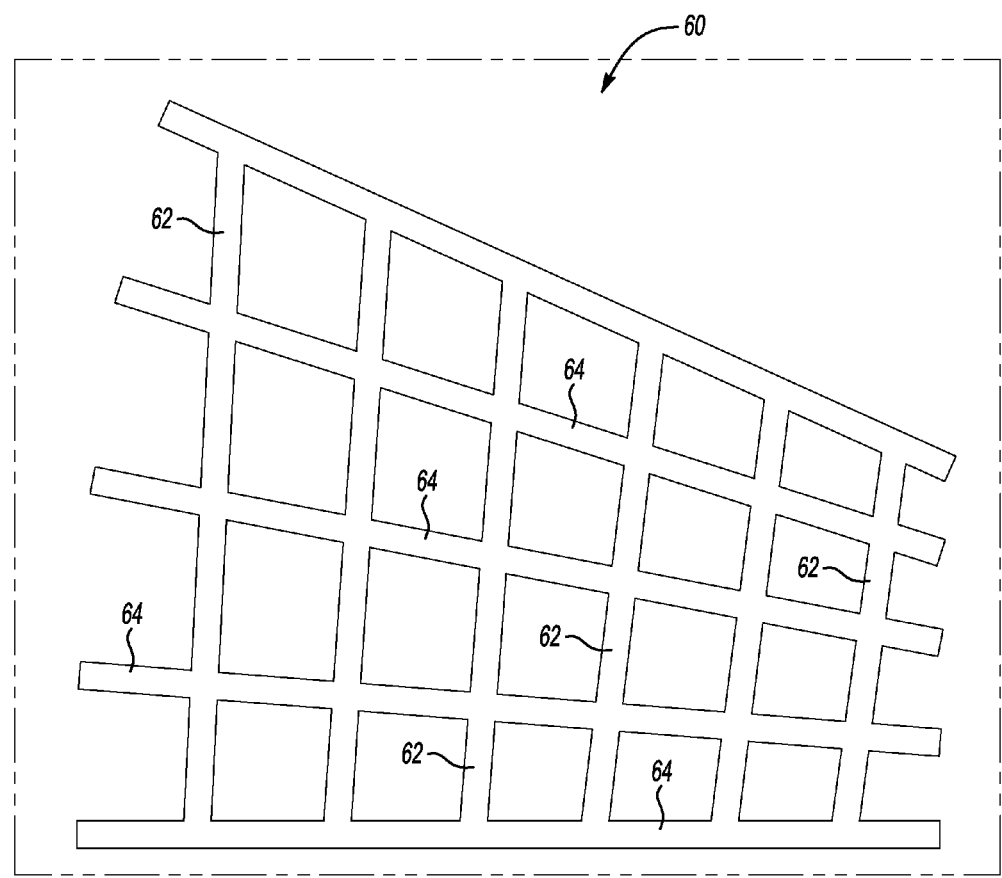
FIG. 7 is a diagrammatic view of an electro-hydraulic forming tool illustrating ribs aligned in a non-parallel fashion.

Referring to FIG. 7, an alternative pattern of V-shaped reinforcing ribs is illustrated on a panel 60. The panel 60 includes a set of non-parallel vertical ribs 62 and a set of non-parallel horizontal ribs 64. The ribs may also be curved or otherwise non-linear depending upon the nature and direction of the reinforcement that is desired in the finished panel 60.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of reinforcing a part comprising:
   forming a metal panel into a three dimensional shape that includes a predetermined area requiring reinforcement;
   placing the predetermined area between a one-sided die and an electro-hydraulic chamber that includes a first plurality of wire electrodes that extend in a first direction;
   discharging a stored electrical charge through the sires to form a first set of grooves into a V-shaped cross-section having an internal radius of less than one-half the thickness of the panel in the one-sided die;
   placing the predetermined area between the one-sided die and the electro-hydraulic chamber that includes a second plurality of wire electrodes that extend in a second direction that is different than the first direction; and
   discharging a stored electrical charge through the wires to form a second set of grooves into a V-shaped cross-section having an internal radius of less than one-half the thickness of the panel, wherein the first and second sets of grooves intersect at a predetermined angle.

2. The method of claim 1 wherein the step of forming a grid pattern further comprises discharging a forming pulse against the area requiring reinforcement and forming the grid pattern into a one-sided die.

3. The method of claim 1 wherein the step of forming a grid pattern further comprises forming a grid of V-shaped cross-section grooves into a one-sided die that includes a first set of parallel grooves extending in a first direction and a second set of parallel grooves extending in a second direction, and wherein the first and second sets of grooves intersect at a predetermined angle.

4. The method of claim 3 wherein the predetermined angle is approximately a right angle.

5. A method of reinforcing a part comprising:
   forming a panel that includes a predetermined area requiring reinforcement;
   placing the predetermined area between a one-sided die and an array of electrodes that are aligned in a first direction and in a second direction, that intersect; and
   discharging the plurality of electrodes to form a first plurality of channels in the first direction and a second plurality of channels in a second direction.

6. The method of claim 5 wherein the channels formed by the electrical discharge are formed into a V-shaped cross-section.

7. The method of claim 5 wherein the electrodes are connected to a source of stored electrical power having a first polarity, and wherein the panel is connected to the source of stored electrical power having a second polarity that is opposite the first polarity.

* * * * *